United States Patent [19]

Nishino et al.

[11] Patent Number: 4,861,657
[45] Date of Patent: Aug. 29, 1989

[54] ARTICLE HAVING INSULATION ABRASION COATED LAYER

[75] Inventors: Atsushi Nishino, Neyagawa; Masaki Ikeda, Hirakata; Yoshihiro Watanabe, Moriguchi; Masahiro Hiraka, Hirakata, all of Japan

[73] Assignee: Matsushita Electric Industrial Co., Ltd., Osaka, Japan

[21] Appl. No.: 871,760

[22] Filed: Jun. 6, 1986

[30] Foreign Application Priority Data

Jun. 7, 1985 [JP] Japan .................................. 60-124467

[51] Int. Cl.$^4$ ........................ B32B 15/04; B32B 17/06
[52] U.S. Cl. ................................... 428/336; 428/432; 428/457; 428/469; 428/471
[58] Field of Search ............... 428/432, 469, 471, 336; 427/58, 376.2

[56] References Cited

U.S. PATENT DOCUMENTS

| | | | |
|---|---|---|---|
| 3,939,295 | 2/1976 | Robertson et al. | 427/376.2 |
| 4,690,846 | 9/1987 | Wada et al. | 428/432 X |
| 4,702,963 | 10/1987 | Phillips et al. | 428/432 X |
| 4,746,578 | 5/1988 | Kondo et al. | 428/432 |

FOREIGN PATENT DOCUMENTS 0043639  1/1982  European Pat. Off. ......... 427/376.2

Primary Examiner—Thomas J. Herbert
Attorney, Agent, or Firm—Wenderoth, Lind & Ponack

[57] ABSTRACT

The present invention relates to an article having an insulation abrasion-resistance coated layer composed of glass ceramics containing a given amount or more by weight at least either of oxides of divalent alkaline earth metals of a group composed of BaO, MgO, CaO and ZnO and containing a given amount or less the oxides of univalent alkali metal of a group composed of $Na_2O$, $K_2O$ and $Li_2O$ on the surface of the metallic base body. As it may be used in bearing, mechanical seal and tape guide post, the abrasion-resistance of the sliding portion may be improved.

12 Claims, 6 Drawing Sheets

ARTICLE HAVING INSULATION ABRASION COATED LAYER

BACKGROUND OF THE INVENTION

1. Field of the Invention

The present invention relates to an article having an insulation abrasion-resistance coated layer, such as a glass ceramic layer coated thinly on the surfaces of a bearing of a small-size motor, of a bearing of an ultrasmall-size motor or on a metallic base body of the sliding portion of a mechanical seal which coated article has insulation and abrasion-resistance characteristics.

2. Description of the Prior Art

When the insulation abrasion-resistance layer is applied on a sliding portion of a bearing of the small-size motor, the effect of the present invention is considerable. Thus, the bearing of a small-size motor will be described in detail by way of an example as a description of the prior art.

In recent years, the small-size motor is used not only for household and industrial use, but also for ultrasmall size under the social lighter, thinner, shorter, smaller demands, thus increasing the ratio of the coreless motor. FIG. 7 shows a cross-sectional view of a coreless DC motor.

In FIG. 7, a shaft 5 whose tip end is formed circular is rotatably supported by a sleeve-shaped radial bearing 9 provided on a frame 11. A commutator 7 is mounted, with a plurality of forming windings 6 being integrally formed with the shaft 5 by the plastic forming material 8, to construct a rotor. A magnet 12 is secured to the frame 11 against the forming windings 6. Reference numeral 13 is a yoke. A brush 4 comes into slidable contact against the commutator. A bracket 21 which covers the opening of the end portion of the frame 11 is provided, at the center of the inner bottom portion, with a thrust bearing 20, which is adapted to receive the tip end of the shaft 5.

In the above construction, the shaft 5 is adapted to receive the load of the thrust direction by the thrust bearing 20 when the shaft is rotated through the support by the sleeve-shaped radial bearing 9. The load of which the thrust bearing receives at this time becomes 300 through 600 gr in a system where the thrust load is applied by the use of the magnetic force to prevent the vertical motion of the rotor. In the case of the shaft of 1 through 2 mm in diameter, the diameter becomes approximately 0.2 mm in the thrust bearing contact portion of the tip end, the load per unit area becomes 9.5 through 20 Kg f per cm$^2$. The thrust bearing 20 which receives the load and rotates at high speeds is likely to extremely wear out. If the bearing is constructed of ceramic material such as partially stabilized zirconia, silicon carbide, alumina or the like, which is superior in abrasion resistance respectively, as a precaution against wearout, the metallic shaft would be inconveniently worn out. Also, it is difficult to redesign the size of the ceramic bearing. It is vulnerable to impacts when it is made thinner and smaller. When the impact resistance is improved, the bearing becomes larger, thus making it difficult to design the ultrasmall type motor. In view of these problems, there is a long demand to produce bearings which are superior in impact resistance, have good abrasion resistance and which have insulation characteristics of 20 through 200 μm.

Table 1 shows the materials in a bearing corresponding that is conventionally used in the art, as well as the abrasion amounts, the impact resistances, and the current change in the amount thereof.

The test conditions of Table 1 are as follows.
1. Test temperature: ambient temperature
2. Revolution number: 2200 rpm
3. Rated output: 0.1 W
4. Voltage: 4.2 V
5. Current value: 100 mA In Table 1, the ⊙ mark shows superior impact resistance, and the X mark shows inferior impact resistance. As shown in the results of Table 1, the bearing materials which are superior in abrasion resistance, impact resistance and insulation resistance are desired.

TABLE 1

| | Material Name | Abrasion Amount (μm) 500 H | 1000 H | Impact Resistance | Current Value mA |
|---|---|---|---|---|---|
| 1 | 66 nylon | 20 | 40 | ⊙ | 105 |
| 2 | 6 nylon | 40 | 70 | ⊙ | 110 |
| 3 | Polyacetal | 40 | 70 | ⊙ | 110 |
| 4 | Zirconia | 50 | 100 | X | 112 |
| 5 | Alumina | 50 | 100 | X | 112 |
| 6 | Silicon carbide | 50 | 100 | X | 108 |

SUMMARY OF THE INVENTION

Accordingly, a main object of the present invention is to improve the abrasion resistance, the insulation, the impact resistance of an article such as, for example, the bearing of a small-size motor, or the mechanical seal.

The present invention has a glass ceramic layer thinly coated on the surfaces of the bearing of the small-sized motor or of the metallic base body of the sliding portions of the mechanical seal to form a glass ceramic coated layer, which is capable of achieving the various functions such as insulation, abrasion resistance, impact resistance, etc. Thus, in the case of a bearing or the like, the abrasion amount is reduced, the consumption power is reduced, the wows/flutters are reduced and the vibration noises are improved.

By the above means, the motor is improved in reliability and in longer service life without being worn out with both the shaft and the bearing being kept insulated with respect to each other. Also, the slidability and size precision of the bearing are improved, thus allowing the motor to be improved in performance and also making possible the design of an ultrasmall-sized motor.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
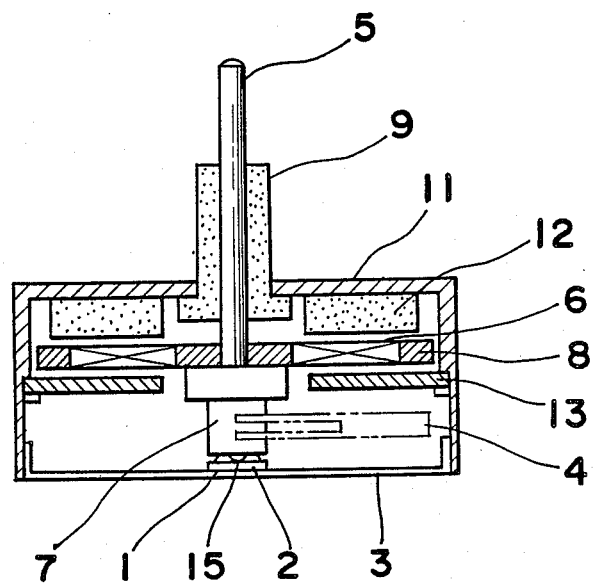
FIG. 1 is a cross-sectional view of a small-sized motor in one preferred embodiment of the present invention.

Before the description of the present invention proceeds, it is to be noted that like parts are designated by like reference numerals throughout the accompanying drawings.

EMBODIMENTS

The embodiments of the present invention are directed to an article having an insulation abrasion-resistance coated layer in such a manner that, for example, the glass ceramics are thinly coated on the single face or both faces of a metal plate as the thrust bearing, and the glass ceramics coated layer is formed only on the functional portion of the thrust bearing on the single face of the steel plate, which is served as the motor case.

EMBODIMENT 1

A concrete embodiment where the insulation abrasion-resistance glass coated layer of the present invention is applied on the bearing will be described in detail. In order to more effectively employ the present invention, there are various necessary conditions, which will be concretely described hereinafter.

(1) Conditions of Metallic Base Material

The glass ceramic coated layer of the present invention is provided on the single face or both faces of a metallic base material. As the metallic base material, (a) a low carbon steel plate for porcelain enamel, (b) an aluminized steel plate, (c) a stainless steel plate, or other similar steel plates may be used. However, the thermal expansion coefficient of the metal plate is desired to be within the range of 60 through $140 \times 10^{-7}/°C$.

(2) Method of Applying Glass Ceramics

To effectively apply the glass ceramic coated layer of the present invention on the small-sized motor, the ultrasmall-sized micromotor and the sliding portion of the mechanical seal, a slip composed of glass frit of glass ceramics is required to be correctly coated.

As the methods of coating, there are (a) an electrophoresis method, (b) a screen printing method, (c) a spray method and so on.

(3) Types of Glass Ceramics

A bearing is produced (the composition of the glass is shown in Table 3) by the use of two types of glass A and glass B, representative as glass ceramics.

Figure 7:
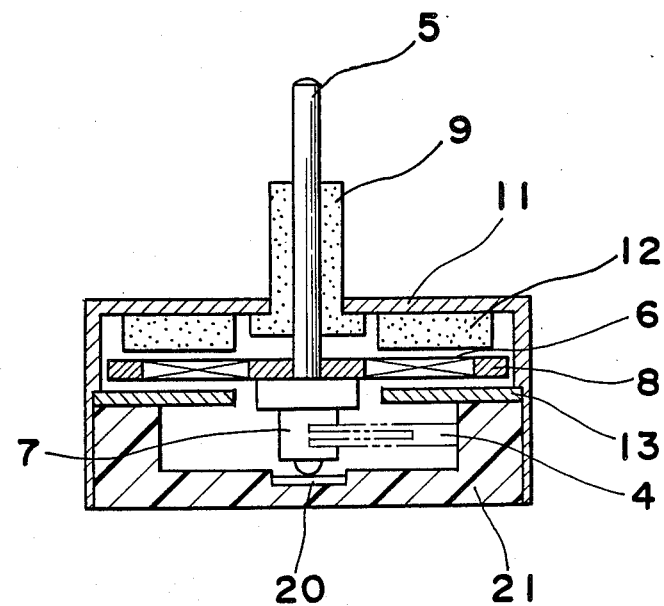
FIG. 7 is a cross-sectional view of a small-size motor in the conventional example (already referred to)

FIG. 1 illustrates the bearing of the present invention, wherein the glass ceramics coated layer is partially applied only on the functional portion 2 of the thrust bearing portion 1 on the signal face of the steel plate 3 which serves as the motor case. It is to be noted that the common numerals are given to the elements common to those in the conventional example shown in FIG. 7.

Figure 2:
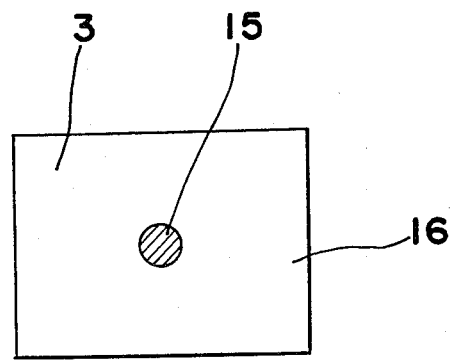
FIG. 2 is a cross-section view, wherein an insulation abrasion-resistance coated layer is formed on the thrust bearing portion of a motor case base material in another embodiment of the present invention.

In a function portion 2 of the bearing portion 1 of a metallic motor case 3, a coated layer 15 of the glass ceramics is formed on a base plate 16 with the use of the slip printing ink composed locally of glass ceramics as shown in FIG. 2.

Figure 3:
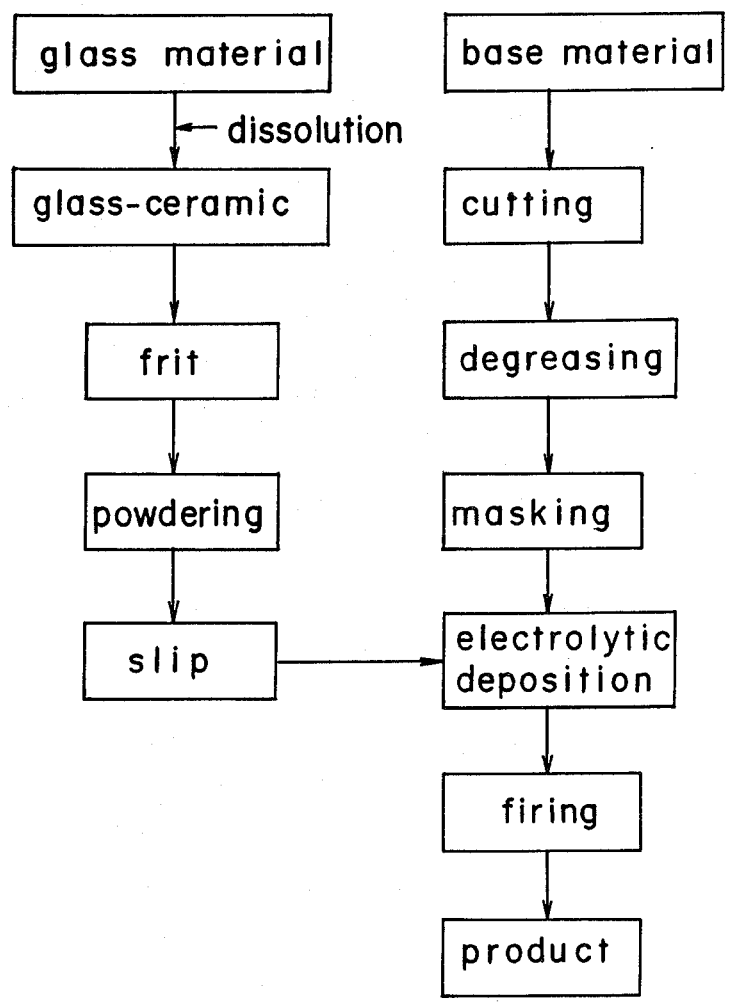
FIG. 3 is a flow chart showing manufacturing processes of the one embodiment of the present invention.

FIG. 3 shows in a flow chart a method of forming the insulation abrasion-resistance layer by an electrophoresis method. The glass material is first dissolved at 1250° through 1350° C. so that the cullets of the glass ceramics are provided by a roller quench method. They are powdered to produce the slips with ethyl alcohol or isopropyl alcohol.

On the other hand, the metallic base material is cut off into given shapes, is degreased, and the masking is performed to locally perform partial electro-deposition. It is placed in the electrolytic bath. The glass powder particles dispersed in alcohol are electrodeposited in the electrophoresis with 2 through 3 cm in interpole intervals, at a cell voltage of 250 to 600 V, are fired at at temperatures of 760° through 950° C. after the surface drying to produce the insulation abrasion-resistance coated layer of the glass ceramics. Grease is coated on the sliding face of this coated layer. Returning to FIG. 1 again, the shaft 5, whose tip end is formed circular, is rotatably supported by the sleeve bearing 9 provided on the frame 11. The commutator 7 is disposed with a plurality of forming windings 6 being integrally formed with the shaft 5 by the plastic moldings 8 so as to compose a rotor. The magnet 12 is secured to the frame 11 against the forming windings 6, providing with the yoke 13. The brush 4 is in sliding contact with the commutator 7. A motor case 3 covers the end opening of the frame 11, the glass coated layer 15 having the insulation abrasion-resistance property is provided, at the center of the inner bottom portion, on the function portion 2 of the thrust bearing portion 1 receiving the tip end of the shaft 5.

The characteristics provided under these conditions are represented in Table 2. The various motor evaluation test conditions (test temperatures, revolution number, etc.) in Table 2 are the same as those of Table 1.

TABLE 2

| Bearing | Material of Glass Ceramics | Forming Method | Thickness μm | Average Roughness Ra (μ) | Abrasion Amount (μ) 500 H | Abrasion Amount (μ) 1000 H | Size Precision of Thickness | Current Value | Wow Flutter |
|---|---|---|---|---|---|---|---|---|---|
| (1) | Glass A | Electrophoresis Method | 60 | 0.025 | 0 | 5 | ◉ | 100 | 0.04 |
| (2) | Glass A | Screen Method | 60 | 0.3 | 0 | 4 | ○ | 101 | 0.06 |
| (3) | Glass A | Spray Method | 120 | 0.98 | 0 | 9 | △ | 105 | 0.35 |
| (4) | Glass N | Electrophoresis | | | | | | | |

TABLE 2-continued

| Bearing | Material of Glass Ceramics | Forming Method | Thickness μm | Average Roughness Ra (μ) | Abrasion Amount (μ) 500 H | Abrasion Amount (μ) 1000 H | Size Precision of Thickness | Current Value | Wow Flutter |
| --- | --- | --- | --- | --- | --- | --- | --- | --- | --- |
| | | Method | 60 | 0.15 | 5 | 23 | X | 110 | 0.11 |

It is found out from the results of Table 2 that in the case of bearings (1) through (3) using glass A, the evaluation results as a motor are different depending upon the forming method of the insulation abrasion-resistance layer even if the material of the glass ceramics is the same. Considering the characteristics, the method becomes the electrophoresis method > the screen method > the spray method in order as the forming method of the abrasion-resistance layer. Table 2 indicates that a method of forming the abrasion-resistance layer of the glass ceramics by the electrophoresis method is highest in size accuracy and superior in characteristics.

It is found out in Table 2 that when the glass N is used, the size accuracy of the thickness is poor and the characteristics of the motor are not so good as would have been expected when using the electrophoresis method. Namely, it is found that the characteristics of the insulation abrasion-resistance property can not be displayed when certain compositions of glass are used in the glass ceramics, even when an electrophoresis method is used. Thus, in the following example, the compositions of the glass ceramics are examined to compare the characteristics.

EMBODIMENT 2

As the insulation abrasion-resistance characteristics are different because of the composition of the glass ceramics, even if an electrophoresis method is used in embodiment 1, nineteen types of glass compositions are examined from glass A to glass S in Table 3.

Table 3 shows that the electrodeposition properties by the characteristics of the glass and the electrophoresis is considerably different because of the addition amount (weight percent) of the oxides ($Li_2O$, $K_2O$, $Na_2O$) of univalent alkali metals in glass composition and the oxides (BaO, MgO, CaO, ZnO) of divalent alkaline earth metals.

TABLE 3

| Glass Types | Ornamentation Oxide | | | | | | | Mesh Forming Oxide | | | Intermediate Oxide (Others) | | | Electro-deposition Property | Thermal Expansion Coefficient ×10⁻⁷ /°C | Insulation Withstand Voltage KV | Vickers Hardness HV | Surface Roughness μm | Abrasion Amount 1000 H μ | Overall Evaluation |
|---|---|---|---|---|---|---|---|---|---|---|---|---|---|---|---|---|---|---|---|---|
| | Univalent Alkali Metal Oxide | | | Divalent Alkaline Earth Metal Oxide | | | | | | | | | | | | | | | | |
| | Li₂O | K₂O | Na₂O | BaO | MgO | CaO | ZnO | SiO₂ | B₂O₃ | Al₂O₃ | ZrO₂ | TiO₂ | Others | | | | | | | |
| A | — | — | 0.2 | 19 | 40 | 0.2 | — | 18 | 15 | 1 | 1 | — | 5.6 | ○ | 135 | 5 or more | 750 | 0.025 | 5 | ⊙ |
| B | — | — | 0.2 | 15 | 44 | 0.2 | — | 18 | 15 | 1 | 1 | — | 5.6 | ○ | 133 | 5 or more | 760 | 0.030 | 6 | ⊙ |
| C | — | — | 0.2 | 13 | 44 | 0.2 | — | 20 | 15 | 1 | 1 | — | 5.6 | ○ | 130 | 5 or more | 765 | 0.035 | 8 | ○ |
| D | — | — | 0.4 | 19 | 40 | 0.2 | — | 17.8 | 15 | 1 | 1 | — | 5.6 | ○ | 140 | 5 or more | 720 | 0.045 | 7 | ○ |
| E | — | — | 1.0 | 19 | 39.2 | 0.2 | — | 18 | 15 | 1 | 1 | — | 5.6 | ○ | 143 | 3 | 670 | 0.1 | 11 | ○ |
| F | — | — | 2.0 | 19 | 38.2 | 0.2 | — | 18 | 15 | 1 | 1 | — | 5.6 | ○ | 145 | 2.5 | 620 | 0.5 | 12 | ○ |
| G | — | — | 3.0 | 19 | 37.2 | 0.2 | — | 18 | 15 | 1 | 1 | — | 5.6 | ○ | 150 | 0.5 | 580 | 1.0 | 15 | △ |
| H | — | — | 0.2 | — | 0.2 | 11 | 51 | 15 | 15 | 1 | 1 | — | 5.6 | △ | 123 | 5 or more | 615 | 0.060 | 14 | ○ |
| I | — | — | 0.2 | — | 0.2 | 30 | 35 | 22 | 15 | 1 | 1 | — | 5.6 | ○ | 128 | 5 or more | 628 | 0.065 | 13 | ○ |
| J | — | 0.2 | — | 19 | 40 | 0.2 | — | 18 | 15 | 1 | 1 | — | 5.6 | ○ | 137 | 5 or more | 715 | 0.03 | 5 | ⊙ |
| K | — | 0.2 | — | 19 | 40 | 0.2 | — | 18 | 17 | — | — | — | 5.6 | ○ | 141 | 5 or more | 726 | 0.02 | 5 | ⊙ |
| L | 0.2 | — | — | 19 | 40 | 0.2 | — | 18 | 17 | — | — | — | 5.6 | ○ | 141 | 5 or more | 730 | 0.025 | 6 | ⊙ |
| M | 4.5 | 5 | 19 | — | — | — | — | 44.5 | 14 | 10 | — | — | 3.0 | △ | 120 | 0.5 | 280 | 0.93 | 48 | × |
| N | 0.97 | 10.28 | 7.16 | — | — | — | — | 34.1 | 17.45 | — | 7.27 | 12.4 | 10.37 | △ | 100 | 0.5 | 350 | 0.94 | 23 | × |
| O | 1.85 | — | 18.8 | — | — | — | 16.7 | 35.27 | 16.72 | 2.78 | 2.36 | — | 6.02 | △ | 99 | 0.5 | 380 | 0.8 | 19 | × |
| P | — | — | 0.21 | 0.27 | 2.1 | 31.2 | — | 15.9 | 41.7 | 6.6 | — | 0.4 | 1.62 | ○ | 68 | 5 or more | 680 | 0.15 | — | ○ |
| Q | — | — | 0.2 | 19 | 45 | 0.2 | — | 18 | 20 | 1 | 1 | — | 5.6 | ○ | 128 | 5 or more | 660 | 0.03 | 6 | ⊙ |
| R | — | — | 5.2 | 19 | 35 | 0.2 | — | 18 | 15 | 1 | 1 | — | 5.6 | △ | 119 | 0.5 | 670 | 0.7 | 16 | × |
| S | — | — | 10.2 | 19 | 30 | 0.2 | — | 18 | 15 | 1 | 1 | — | 5.6 | △ | 124 | 0.5 | 540 | 0.8 | 19 | × |

Figure 4:
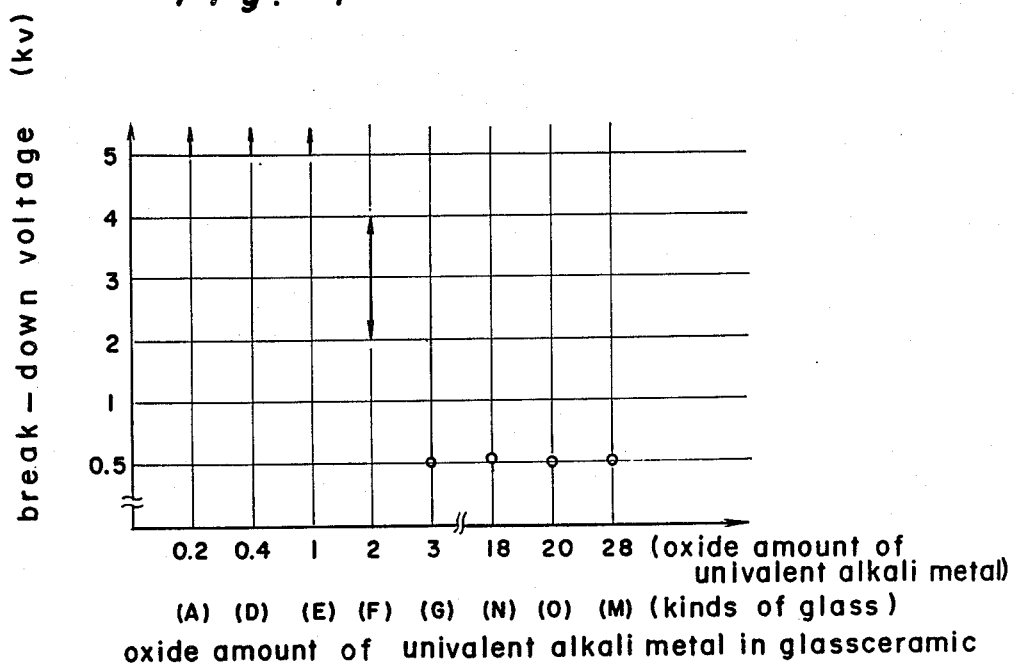
FIG. 4 is a graph showing the correlation between the univalent alkali oxide amount in the glass and the insulation break-down voltage.
Figure 5:
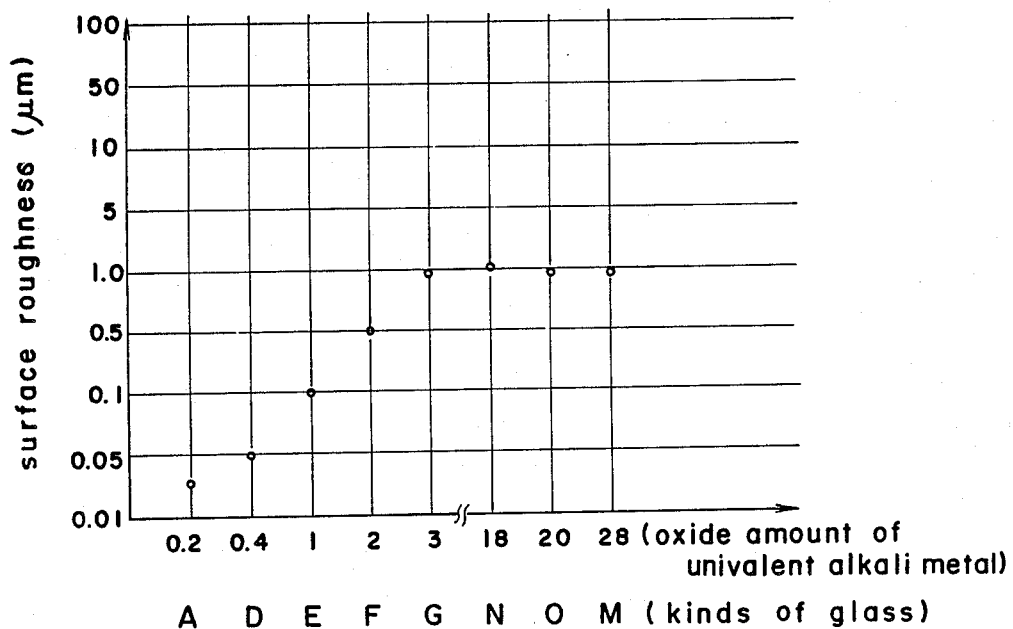
FIG. 5 is a graph showing the correlation between the univalent alkali oxide amount in the glass and the surface roughness (Ra) of the insulation abrasion-resistance layer.

The characteristics of Table 3 and the results of FIG. 4 and FIG. 5 will be summarized.

(1) The oxides (($Li_2O$, $K_2O$, $Na_2O$) of the univalent alkali metals in the composition of the glass is desiarble 0.2 to 2% by weight in range. The 0.2% by weight or lower is a limit for impurity mixture. It is difficult to compose the glass of this percent or lower. Reversely, when the percent becomes 2% by weight or more, the insulation break-down voltage is quickly deteriorated, the Vickers hardness, the abrasion amount of the glass ceramics becomes, also, deteriorated correspondingly (E, F, G, A, M, N, O, P).

(2) The amount of the oxides (BaO, MgO, CaO, ZnO) of the divalent alkaline earth metals is preferable 15% or more by weight at minimum, particularly the total amount of the oxides of the divalent alkaline earth metals is preferable 55% or more by weight. A balance between the univalent alkali metal-oxide amount and the divalent alkaline earth metal-oxide amount is required.

(3) When the univalent alkali metal-oxide amount is 2% or lower by weight, the electrodeposition is facilitated by an electrophoresis method at a voltage 250 of 350 V in request to the cell voltage, the surface roughness, the Vickers hardness, the abrasion amount, etc. are superior in most of the characteristics (A, B, J, K, L, Q) as compared to compositions in which the percentage falls outside this range.

(4) When the amount of univalent alkali metal-oxide in the glass ceramic amount increases, a voltage as high as 350 through 650 in cell voltage is required during the electrophoresis electrodeposition. Correspondingly, the insulation withstand or breakdown voltage becomes 0.5 kV or lower (G, N, O, M), (FIG. 4 and Table 3) and the surface roughness of the glass also becomes inferior as shown in FIG. 5.

(5) Generally, the enamel glass (M, N, O) is relatively high in the amount of univalent alkali metal-oxides, and less in the amount of divalent alkali metal-oxides or has no divalent alkali metal-oxides. The high voltage is required during the electrophoresis electrodeposition. Though it is improved as an insulation abrasion-resistance coated layer for motors as compared with the conventional method, the characteristics are inferior to those of the other glasses in Table 3.

(6) The surface roughness of the abrasion-resistance coated layer of the glass ceramics to be formed on the surface of the metal basic material is desired to be within the range of 0.05 through 0.5 $\mu$m, when measured by a Tallysurf surface roughness meter, in terms of the abrasion resistance of the wow flutter. A roughness Ra of 0.05 or lower is not economical, because it cannot be achieved by singly using the manufacturing process shown in FIG. 3 of the present invention, and an additional lapping process is newly required. A roughness Ra of 0.5 or more is not desired because it produces undesireable effects in the abrasion-resistance, the wow flutter, an the noise of the motor.

(7) The thickness of the glass ceramics coated layer of the present invention is desired to be in the range of 20 through 200 $\mu$m. Although the roughness of 20 $\mu$m or lower may be, also, provided by control of the electrolysis time, the thickness is desirable to be 20 $\mu$m or more in terms of the mechanical strength of the glass layer, the surface roughness of the glass layer, the adherence with respect to the metal base material. Also, the thickness is not required to be increased to 200 $\mu$m or more. If the material of the glass ceramics is to be a good glass as glass A, the thickness of 200 $\mu$m may sufficiently exhibit the functions of insulation and abrasion-resistance.

(8) In the thermal expansion coefficient of the glass ceramics, it is difficult to compose the glass in the case of $60 \times 10^{-7}/°C$. or lower as apparent from Table 3. Also, most of the metal base materials are within the range of 60 through $145 \times 10^{-7}/°C$. Accordingly, the glasses (A, B, C, D, E, F, H, I, J, K, L, P, Q) are preferable as glasses, which are superior in insulation, abrasion resistance with the electrodeposition through the electrophoresis being performed within the range of $145 \times 10^{-7}/°C$. and $60 \times 10^{-7}/°C$. in the thermal expansion coefficient of glass. The combination may be decided by the matching of the thermal expansion coefficients through the choice of the metal base material and the choice of the glass.

As shown in Table 3, the insulation abrasion-resistance coated layer of the present invention, though it depends upon the composition of the glass, shows the superior abrasion-resistance characteristics as the bearing of the motor.

EMBODIMENT 3

For the glass in Table 3, A is used. A glass powder of 400 g and isopropyl alcohol of 1 l are put into the ball mill. They are milled for twenty hours. The glass powder in the suspension at this time is 2.0 $\mu$m in average particle diameter. The glass powder is electroanalyzed into the metal base body with the use of the suspension, is fired at 850° C. to form the motor of FIG. 1.

EMBODIMENT 4

The same glass as that in embodiment 3 is used and is milled in the same thrown amount for ten hours. The average particle diameter at this time is 7.0 $\mu$m. The motor is formed in the same method as that in embodiment 3.

COMPARISON EMBODIMENT 1

The same material as in embodiments 3 and 4 was used and milled in the same method for thirty hours. The suspension of 1.0 $\mu$m in the average particle diameter was produced. Electrodeposition through the use of electrophoresis was performed. However, when the metal base body was picked up from the suspension, the electrodeposition layer was suddenly dried, thus causing the cracks on the surface. Thereafter, the peeling off was caused. Accordingly, the insulation abrasion coated layer could not be formed.

COMPARISON EMBODIMENT 2

The material was milled for eight hours in the same method as in comparison embodiment 1. The suspension of 8.0 $\mu$m in the average particle diameter was produced to form the motor.

The evaluation shown in Table 4 is carried out about four motors in the above-described embodiments. The evaluation test conditions (test temperature, rotation numer and so on) of the various types of motors in Table 4 are the same as those in Table 1.

TABLE 4

| Sample No. | Average Particle Diameter | Thickness (μm) | Average Roughness Ra (μm) | Abrasion Amount (μm) 500 hours | Abrasion Amount (μm) 1000 hours | Remarks |
| --- | --- | --- | --- | --- | --- | --- |
| Embodiment 3 | 2.0 | 100 | 0.1 | 0 | 10 | |
| Embodiment 4 | 7.0 | 100 | 0.3 | 10 | 20 | |
| Comparison Embodiment 1 | 1.0 | — | — | — | — | Impossible to form |
| Comparison Embodiment 2 | 8.0 | 100 | 0.5 | 12 | 40 | |

The motor of FIG. 1 is used in a compact disc or the like. As the insulation abrasion coated layer is worn out by 30 μm or more, errors are caused in the reading of the disc, thus making it impossible to be used as the compact disc. Thus, the motor which is worn out by 30 μm in amount cannot be used as a product. Thus, comparison embodiment 2 is impossible to be used.

Accordingly, the surface average roughness (Ra) is required to be 0.3 μm or lower to reduce the abrasion amount of the insulation abrasion coated layer, while the average particle diameter of the glass ceramics in the suspension is required to be 7.0 μm or lower to make the surface average roughness (Ra) 0.3 μm or lower. However, as the electrodeposition layer is likely to be peeled off when the average particle diameter becomes 2.0 μm or lower, the proper range of the particle diameter is found out to be 2.0 μm through 7.0 μm.

EMBODIMENT 5

In embodiment 1 and embodiment 2, the application example wherein the insulation abrasion-resistance coated layer of the present invention applied upon the thrust bearing of the motor is described in detail. The coated layer of the present invention may be developed in application similarly even upon the radial bearing of the small-size motor.

Figure 6:
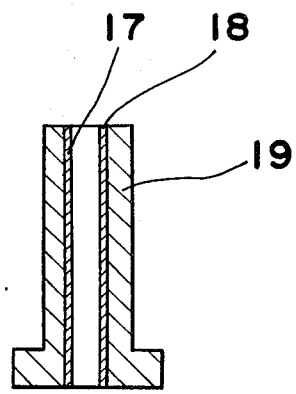
FIG. 6 is a cross-sectional view where the present invention is applied to the sleeve type of radial bearing.

FIG. 6 is a cross-sectional view of the radial bearing. As the glass ceramics of the present invention is coated on the inner surface 17 of the metallic base material 19 of the radial bearing, the sectional portion of the glass ceramics abrasion-resistance layer 18 is provided. The radial bearing may be also manufactured in accordance with the manufacturing process of FIG. 3.

EMBODIMENT 6

Figure 8:
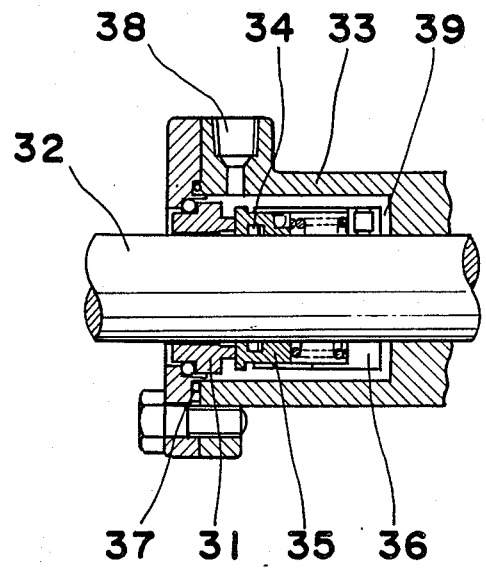
FIG. 8 is a cross-sectional view of the mechanical seal in one application example of the present invention.

The present invention is also applicable even in the use of the mechanical seal. Namely, it may be used as a complete sealing apparatus for liquid or gas in the rotation portions of each type of machine. FIG. 8 shows the representative construction.

The glass ceramics of about 100 μm in thickness in the same method as in the embodiment 3 on the inner face of the seat ring 31 is provided on the mechanical seat. Reference numeral 32 is a rotary shaft, reference numeral 33 is a stuffing box, reference numeral 34 is a shaft packing, reference numeral 35 is a followed ring, reference numeral 36 is a stopper, reference numeral 37 is a gasket, reference numeral 38 is a bushing hole, reference numeral 39 is fluid on the high-pressure side. A corrosion resistance metal such as stainless steel, Hastelloy or the like is used as the conventional seat ring.

For comparison between the present invention and the conventional product, the mechanical seal of FIG. 8 is assembled to measure time taken before leakage for the evaluation.

It is to be noted that the fluid used for the experiment is 80° C. at temperature, of 5% $H_2SO_4$. Also, the revolution speed of the rotation shaft 32 is 200 rpm in the continuous rotation.

The experiment results at this time are shown below.

| | Continuous Operation Test |
| --- | --- |
| Conventional Embodiment | Leakage starts after about one year |
| Present Invention | Good operation, three years or more (still in operation) |

Namely, the present invention shows considerable enhanced effects as compared with the conventional embodiment.

EMBODIMENT 7

Figure 9:
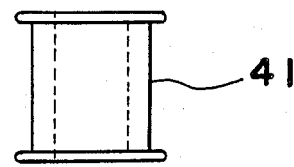
FIG. 9 is a cross-sectional view of a guide post for video cassette recorder (VTR) use in another application example of the present invention.
Figure 10A:
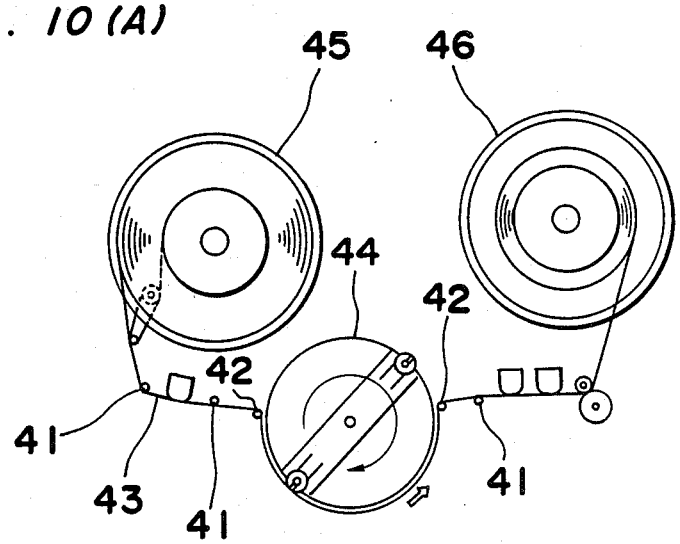
FIGS. 10(A) and 10(B) are a top-face view and a side-face view, respectively, of the tape running system of the VTR in a further application example of the present invention.
Figure 10B:
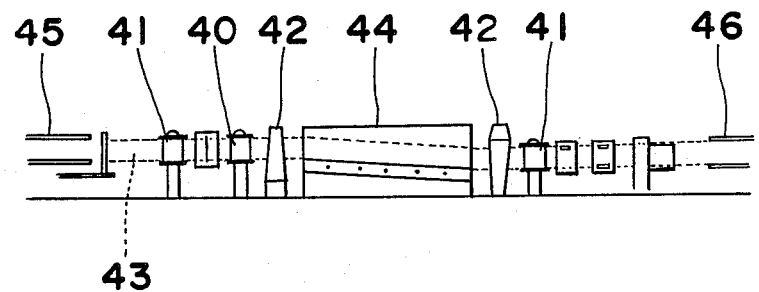

A glass ceramic layer of about 100 μm in thickness is formed on the outer peripheral face of a spool-shaped guide post 41 for video a cassette recorder use shown in FIG. 9 in the same method as in embodiment 3. It is incorporated into the video cassette recorder as shown in FIGS. 10(A) and 10(B) to perform the tape running test for the evaluation. In the drawings, reference numeral 42 is a conical guide, reference numeral 43 is tape, reference numeral 44 is a cylinder provided with a head, reference numeral 45 is a supply reel and reference numeral 46 is a winding reel. Also, the conventional guide post made of stainless steel is employed as a comparison embodiment.

As a test method, 10,000 hours running test of the metal tape is performed to measure the abrasion amount.

| | Tape Running Test |
| --- | --- |
| Conventional Embodiment | Abrasion of about 5 μm |
| Present Invention | 0.1 μm or less |

Namely, the present invention is considerably superior in abrasion resistance as compared with the conventional example.

EMBODIMENT 8

Figure 11:
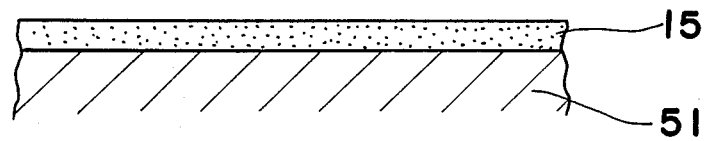
FIGS. 11(A) and 11(B) are cross-sectional views showing the iron base as the further another one application example of the present invention.
Figure 11:
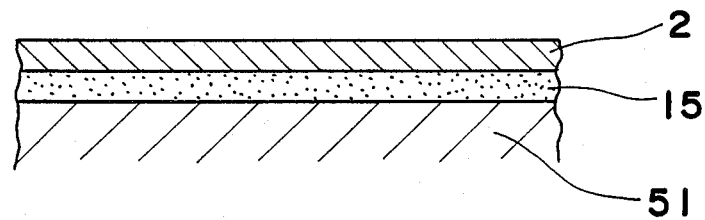

An iron is manufactured for trial with the use of the iron base of the construction (FIG. 11(A)) where a glass ceramic coated layer 15 of about 100 μm in thickness is formed on a steel-plate base material 51 for iron use, and further of the construction (FIG. 11(B)) where a Poly- Tetra-fluoroethylene (=PTFE) resin coated layer 52 is formed thereon in the same method as that of embodiment 3. As the glass ceramics coated layer of the present invention is superior in abrasion resistance and simultaneously is small in surface roughness, it is superior in sliding, thus allowing the application as the iron base. Furthermore, when the PTFE resin coated layer is formed thereon, the effect is further improved.

EMBODIMENT 9

The coating may be applied to a cooking plate use according to such constructions as those of FIGS. 11(A) and 11(B). Such cooking plates which are superior in abrasion resistance, corrosion resistance and non-tackiness thus be manufactured.

As described hereinabove, the insulation abrasion-resistance coated layer is effective in the sliding portion of the bearing, mechanical seal, etc. and may be applied as various types of posts for the tape use of the video cassette recorder.

As is clear from the foregoing description, according to the arrangement of the present invention, the insulation abrasion-resistance layer of 20 through 200 $\mu$m is formed on the surface of a metallic base plate by electrodeposition, through electrophoresis, of the glass ceramics containing the oxide 15% or more by weight of the divalent alkaline earth with 0.2 through 2.0 percent by weight in the content of the oxide of the univalent alkali metal. The article thus provided can be considerably improved in abrasion resistance, wow flutter, noise, current value and so on when it is used as a bearing in the sliding portion of the motor. Also, as the insulation abrasion-resistance layer may be correctly formed in a thin state on the motor or the function face of the sliding portion of the mechanical seal, this greatly contributes towards a smaller appliance, an improvement in reliability and in longer service.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An article having an insulation abrasion-resistance layer coated on a metal substrate, said coated layer composed of glass ceramics, said glass ceramics containing 15% or more by weight of at least one oxide of a divalent alkaline earth metal selected from the group consisting of BaO, MgO, CaO and ZnO, and further containing 2% or less by weight of an oxide of a univalent alkali metal selected from the group consisting of $Na_2O$, $K_2O$ and $Li_2O$.

2. An article having an insulation abrasion-resistance coated layer in accordance with claim 1, wherein the coated layer of the glass ceramics is 20 through 200 $\mu$m in thickness and the central-line surface roughness Ra of the coated layer is 0.05 through 0.5 $\mu$m.

3. An article having an insulation abrasion-resistance coated layer in accordance with claim 1, wherein the thermal expansion coefficient of the glass ceramics is within the range of 60 through $145 \times 10^{-7}$°C.

4. An article having an insulation abrasion-resistance coated layer in accordance with claim 1, wherein the total amount of the oxides of the divalent alkaline earth metals in the glass ceramics is 55% or more by weight.

5. An article having an insulation abrasion-resistance coated layer in accordance with claim 1, wherein the total amount of the oxides of the univalent alkali metals in the glass ceramics is 0.2 through 2% by weight.

6. An article having an insulation abrasion-resistance coated layer in accordance with claim 1, wherein the glass ceramics electrodeposited through the electrophoresis on the surface of the metal substrate is fired to form an insulation abrasion-resistance layer.

7. An article having an insulation abrasion-resistance coated layer in accordance with claim 1, wherein the the metal substrate is dipped in a suspension with glass ceramic particles being dispersed therein, the glass ceramic particles being electrodeposited through electrophoresis on said metal substrate surface, are then fired to form the insulation abrasion-resistance layer, and wherein the average particle diameter of the glass ceramics in said suspension is within the range of 2 $\mu$m through 7 $\mu$m.

8. An article having an insulation abrasion-resistance layer coated on a metal substrate, said coated layer composed of glass ceramics, said glass ceramics containing 15% or more by weight of at least one oxide of a divalent alkaline earth metal selected from the group consisting of BaO, MgO, CaO and ZnO, and further containing 0.2 through 2% by weight of an oxide of a univalent alkali metal selected from the group consisting of $Na_2O$, $K_2O$ and $Li_2$, said glass ceramics having a thermal expansion coefficient of 60 through $145 \times 10^{-7}$°C., and wherein the coated layer of the glass ceramics is 20 through 200 $\mu$m in thickness and the central-line surface roughness Ra of the coated layer is 0.05 through 0.5 $\mu$m.

9. An article having an insulation abrasion-resistance coated layer in accordance with claim 8, wherein the total amount of the oxides of the divalent alkaline earth metals in the glass ceramics is 55% or more by weight.

10. An article having an insulation abrasion-resistance coated layer in accordance with claim 8, wherein the glass ceramics electrodeposited through electrophoresis on the surface of the metal substrate is fired to form an insulation abrasion-resistance layer.

11. An article having an insulation abrasion-resistance coated layer in accordance with claim 8, wherein the metal substrate is dipped in a suspension with glass ceramic particles being dispersed therein, the glass ceramic particles are electrodeposited through electrophoresis on said metal substrate surface and are then fired to form the insulation abrasion-resistance layer, and wherein the average particle diameter of the glass ceramics in said suspension is within the range of 2 $\mu$m through 7 $\mu$m.

12. An article having an insulation abrasion resistance coated layer in accordance with claim 11 in which the insulation abrasion-resistance coated layer has been fired at temperatures of 760° through 950° C.

* * * * *